US008281935B2

(12) United States Patent
Deppermann

(10) Patent No.: US 8,281,935 B2
(45) Date of Patent: Oct. 9, 2012

(54) AUTOMATED PICKING, WEIGHING AND SORTING SYSTEM FOR PARTICULATE MATTER

(75) Inventor: Kevin L. Deppermann, St. Charles, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 13/098,170

(22) Filed: Apr. 29, 2011

(65) Prior Publication Data

US 2011/0210047 A1    Sep. 1, 2011

Related U.S. Application Data

(60) Continuation of application No. 11/376,477, filed on Mar. 15, 2006, now Pat. No. 7,934,600, which is a division of application No. 10/406,910, filed on Apr. 2, 2003, now Pat. No. 7,044,306.

(60) Provisional application No. 60/370,018, filed on Apr. 4, 2002.

(51) Int. Cl.
*B07C 5/16* (2006.01)

(52) U.S. Cl. ......... 209/592; 209/512; 209/645; 209/906

(58) Field of Classification Search ................. 209/44.2, 209/512, 513, 592, 643, 644, 645, 906, 932; 47/1.01 P; 177/50; 406/32, 33
See application file for complete search history.

(56) References Cited

U.S. PATENT DOCUMENTS

| | | | |
|---|---|---|---|
| 2,488,037 A | * | 11/1949 | Rupley ........................... 209/592 |
| 2,756,903 A | | 6/1952 | Kreidler |
| 3,380,626 A | * | 4/1968 | Giannini ....................... 221/200 |
| 3,530,372 A | | 9/1970 | Laukien |
| 3,642,128 A | | 2/1972 | Westwood et al. |
| 3,861,788 A | | 1/1975 | Webster |
| 4,037,970 A | | 7/1977 | Webster et al. |
| 4,040,747 A | | 8/1977 | Webster |

(Continued)

FOREIGN PATENT DOCUMENTS

CL      673-03      2/2004

(Continued)

OTHER PUBLICATIONS

Archibald et al., "Development of Short-Wavelength Near-Infrared Spectral Imaging for Grain Color Classification," SPIE vol. 3543, 1998, pp. 189-198.

(Continued)

*Primary Examiner* — Joseph C Rodriguez
(74) *Attorney, Agent, or Firm* — James E. Davis; Joseph A. Schaper; Harness, Dickey & Pierce, P.L.C.

(57) ABSTRACT

An automated machine is used to handle and manipulate individual pieces of particulate matter. The particulate matter is contained in a bin. The machine operates to pick single individual pieces of the particulate matter from the bin. The picked individual pieces are then conveyed for further handling. Pneumatic transport is primarily used for the conveying operation. One aspect of the handling involves individually weighing each piece of the picked particulate matters. Another aspect of the handling involves sorting the individual pieces of particulate matter into a plurality of receptacles. Yet another aspect of the handling involves both weighing and then sorting the individual pieces of particulate matter, wherein the sorting operation may be performed based upon the measured weight of each piece.

29 Claims, 5 Drawing Sheets

U.S. PATENT DOCUMENTS

| | | | |
|---|---|---|---|
| 4,251,011 A | 2/1981 | Hamilton et al. | |
| 4,260,262 A | 4/1981 | Webster | |
| 4,278,183 A | 7/1981 | Billington | |
| 4,375,854 A | 3/1983 | Hedel | |
| 4,401,236 A | 8/1983 | Germaine | |
| 4,480,765 A | 11/1984 | Tonus | |
| 4,654,592 A | 3/1987 | Zens | |
| 4,734,584 A | 3/1988 | Rosenthal | |
| 4,752,689 A | 6/1988 | Satake | |
| 4,931,061 A | 6/1990 | Young | |
| 4,951,825 A * | 8/1990 | Hawkins et al. | 209/558 |
| 5,051,699 A | 9/1991 | Hanawa et al. | |
| 5,067,631 A | 11/1991 | Baba | |
| 5,132,538 A | 7/1992 | Norris | |
| 5,221,518 A | 6/1993 | Mills | |
| 5,253,302 A | 10/1993 | Massen | |
| 5,308,981 A | 5/1994 | Perten | |
| 5,321,212 A | 6/1994 | Wadell | |
| 5,475,221 A | 12/1995 | Wang | |
| 5,533,145 A | 7/1996 | Shofner et al. | |
| 5,668,374 A | 9/1997 | DiFoggio et al. | |
| 5,751,421 A | 5/1998 | Wright et al. | |
| 5,764,819 A | 6/1998 | Orr et al. | |
| 5,833,947 A | 11/1998 | Rocklage et al. | |
| 5,837,458 A | 11/1998 | Minshull et al. | |
| 5,864,984 A | 2/1999 | McNertney | |
| 5,918,977 A | 7/1999 | Borggaard et al. | |
| 5,991,025 A | 11/1999 | Wright et al. | |
| 6,098,838 A | 8/2000 | Saho et al. | |
| 6,100,526 A | 8/2000 | Mayes | |
| 6,150,158 A | 11/2000 | Bhide et al. | |
| 6,237,286 B1 | 5/2001 | Williames | |
| 6,266,864 B1 | 7/2001 | Barber | |
| 6,397,678 B1 | 6/2002 | Popper | |
| 6,537,826 B1 | 3/2003 | Horigane | |
| 6,640,428 B2 | 11/2003 | Barber | |
| 6,646,264 B1 | 11/2003 | Modiano et al. | |
| 6,688,037 B2 | 2/2004 | Keller et al. | |
| 6,705,827 B2 | 3/2004 | Keller et al. | |
| 6,706,989 B2 | 3/2004 | Hunter et al. | |
| 6,809,819 B1 | 10/2004 | Vinjamoori et al. | |
| 7,044,306 B2 | 5/2006 | Deppermann et al. | |
| 7,258,237 B2 | 8/2007 | Nielsen | |
| 7,367,155 B2 | 5/2008 | Kotyk et al. | |
| 7,410,063 B1 * | 8/2008 | Chang et al. | 209/44.2 |
| 7,483,137 B2 | 1/2009 | Janni | |
| 7,685,768 B2 | 3/2010 | Deppermann | |
| 7,934,600 B2 | 5/2011 | Deppermann | |
| 8,028,469 B2 * | 10/2011 | Deppermann et al. | 47/14 |
| 2001/0014750 A1 | 8/2001 | Ulrich et al. | |
| 2002/0060174 A1 * | 5/2002 | Nakajima | 209/644 |
| 2002/0144458 A1 | 10/2002 | Hunter et al. | |
| 2004/0072143 A1 | 4/2004 | Timmis et al. | |
| 2004/0221335 A1 | 11/2004 | Shewmaker et al. | |
| 2005/0082207 A1 | 4/2005 | Deppermann | |
| 2005/0137744 A1 | 6/2005 | Winkelmolen et al. | |
| 2006/0042527 A1 | 3/2006 | Deppermann | |
| 2006/0042528 A1 | 3/2006 | Deppermann | |
| 2008/0310674 A1 | 12/2008 | Modiano et al. | |

FOREIGN PATENT DOCUMENTS

| | | |
|---|---|---|
| CL | 2189-05 | 5/2007 |
| DE | 3603160 A1 * | 8/1987 |
| DE | 19845883 | 5/1999 |
| DE | 102004063769 | 7/2006 |
| EP | 0636310 | 2/1995 |
| EP | 0730164 | 9/1996 |
| EP | 0750188 | 12/1996 |
| EP | 0511184 | 6/1998 |
| EP | 0539537 | 12/2000 |
| GB | 1355612 | 6/1974 |
| JP | 401156233 | 6/1989 |
| JP | 406284806 | 10/1994 |
| JP | 10319106 | 4/1998 |
| WO | WO 9624830 | 8/1996 |
| WO | WO 9700887 | 1/1997 |
| WO | WO 9844140 | 10/1998 |
| WO | WO 9940419 | 8/1999 |
| WO | WO 9941383 | 8/1999 |
| WO | WO 9958959 | 11/1999 |
| WO | WO 0052990 | 9/2000 |
| WO | WO 0071993 | 11/2000 |
| WO | WO 0122043 | 3/2001 |
| WO | WO 0144828 | 6/2001 |
| WO | WO 0189288 | 11/2001 |
| WO | WO 0259586 | 1/2002 |
| WO | WO 0216090 | 2/2002 |

OTHER PUBLICATIONS

Bauman et al., Inheritance of Variations in Oil Content of Individual Corn (Zea mays L.) Kernels, *Crop Science*, 5:137-138 (1965).

Brimrose Corporation of America, "Seed Meister Luminar 3076," Baltimore, MD, http://www.brimrose.com/seed_mister.html.

Daun et al., "Comparison of Three Whole Seed Near-Infrared Analyzers for Measuring Quality Components of Canola Seed", vol. 71, No. 10, 1994, pp. 1063-1068.

Delwiche, "Single Wheat Kernel Analysis by Near-Infrared Transmittance: Protein Content," Analytical Techniques and Instrumentation, vol. 72, No. 1, 1995, pp. 11-16.

Dowell et al., "Automated Single Wheat Kernel Quality Measurement Using Near-Infrared Reflectance," ASAE Annual International Meeting, 1997, paper No. 973022.

Dowell, "Automated Color Classification of Single Wheat Kernels Using Visible and Near-Infrared Reflectance," Cereal Chemistry, vol. 75(1), 1998, pp. 142-144.

Dowell, Floyd E., "An Intelligent Automated System for Determining Peanut Quality," IEEE International Workshop on Intelligent Robot Systems, Jul. 1990.

Dr. Jolanta Soos, "Industrial Process Monitoring Requires Rugged AOTF Tools", *Laser Focus World*, Aug. 1994.

Gambhir et al. "Simultaneous Determination of Moisture and Oil Content in Oilseeds by Pulsed Nuclear Magnetic Resonance," *JAOCS*, 62(1):103-108 (1985).

Halloin et al. "Proton Magnetic Resonance Imaging of Lipid in Pecan Embryos," *JAOCS*, 70(12):1259-1262 (1993).

Heil et al. "Magnetic Resonance Imaging and Modeling of Water Up-take into Dry Beans," *Lebensm-Wiss u-Technol*, 25:280-285 (1992).

Lakshminarayana et al. "Spatial distribution of oil in groundnut and sunflower seeds by nuclear magnetic resonance imaging," *J. Biosci* 17(1):87-93 (1992).

MacNamara et al., "Multiplex sample NMR: an approach to high-throughput NMR using a parallel coil probe," *Analytica Chimica Acta*, 397:9-16 (1999).

Massie and Norris, "Spectral Reflectance and Transmittance Properties of Grain in the Visible and Near Infrared", Transactions of the ASAE, Winter Meeting of the American Society of Agricultural Engineers, 1965, pp. 598-600.

McEntyre et al., "Comparison of Water Absorption Patterns in Two Barley Cultivars, Using Magnetic Resonance Imaging," *Cereal Chem.*, 75(6):792-795 (1998).

McGinty, et al., A System for Automatic Weight Determination of Individual Grain Kernels: Principles and Evaluation, Cereal Science Today, vol. 19, No. 5, May 1974.

Orman and Schumann, "Comparison of Near-Infrared Spectroscopy Calibration Methods for the Prediction of Protein, Oil, and Starch in Maize Grain," J. Agric. Food Chem. vol. 39, 1991, pp. 883-886.

P.A. Hailey—Pfizer Central Research, "The Role of NIR Spectroscopy in the Measurement of Pharmaceutical Manufacture", <http://www.brimrose.com/hailey.html>.

Paige et al. "Apparatus for Automatic Measurement of Kernel Weight, Length, and Thickness," *Crop Sci. 31*:1314-1318 (1991).

Robutti, "Maize Kernel Hardness Estimation in Breeding by Near-Infrared Transmission Analysis," Analytical Techniques and Instrumentation vol. 72, No. 6, 1995, pp. 632-636.

Rubel et al. "Simultaneous Determination of Oil and Water Contents in Different Oilseeds by Pulsed Nuclear Magnetic Resonance," *JAOCS 71*(10):1057-1062 (1994).

Saito et al. "Application of Magnetic Resonance Imaging to Non-Destructive Void Detection in Watermelon," *Cryogenics* 36(12):1027-1031 (1996).

Sander, et al., System for Automatic Weight Determination of Individual Grain Kernels, Transactions of the American Society Agricultural Engineers, vol. 16, No. 6, pp. 1146-1147, Nov./Dec. 1973.

Siebenmorgen et al. "A Data Acquisition/Control System for Individual Kernel and Thin-Layer Grain Drying Research" *Am. Soc. of Agri. Engrs., Univ. of Ark., 1991 Int'l Summer Meeting, Paper 91-3042*, pp. 1-16 (1991).

Song et al., "Non-invasive Measurement of Moisture Distribution in Individual Wheat Kernels by Magnetic Resonance Imaging," *SPIE*, 2345:414-422 (1994).

Yoshida et al., "An Automatic Sequential Single-Seed Weighing System: Variation in Soybean Seed Weight," Journal of the Faculty of Agriculture, Hokkaido University, vol. 61, Pt. 2, 1983.

* cited by examiner

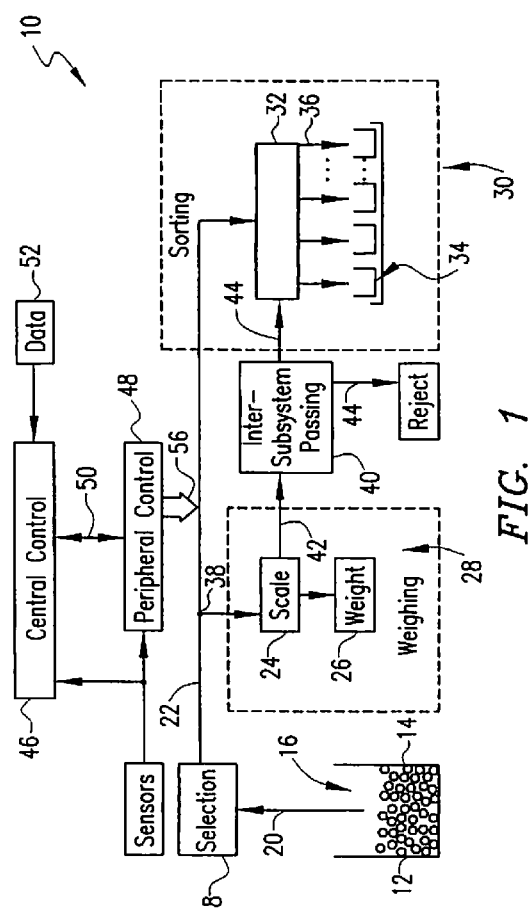
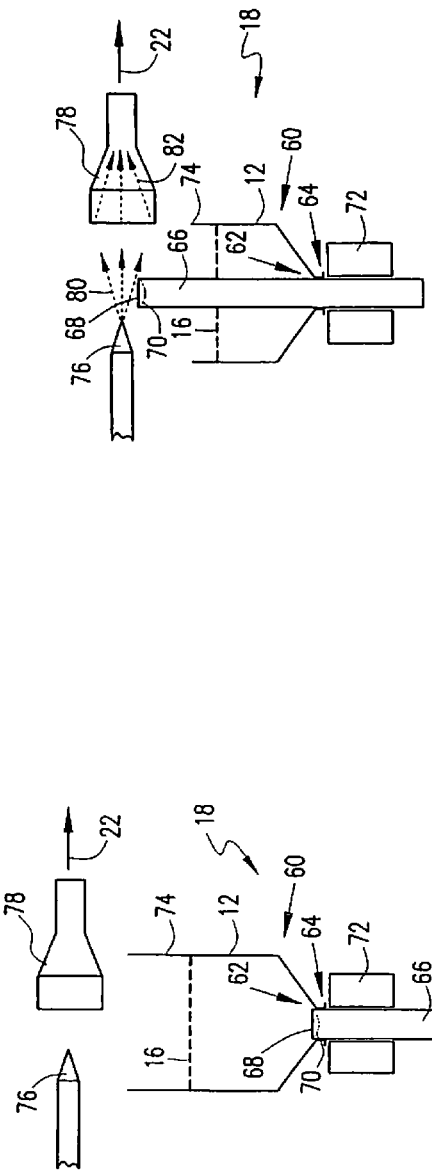
FIG. 1
FIG. 2A
FIG. 2B

AUTOMATED PICKING, WEIGHING AND SORTING SYSTEM FOR PARTICULATE MATTER

CROSS-REFERENCE TO RELATED APPLICATIONS

This application is a continuation application of U.S. patent application Ser. No. 11/376,477, filed Mar. 15, 2006, which is a divisional application of U.S. patent application Ser. No. 10/406,910 (now U.S. Pat. No. 7,044,306), filed on Apr. 2, 2003, which claims priority to U.S. Provisional Application Ser. No. 60/370,018, filed Apr. 4, 2002. The entire disclosures of each of these applications are incorporated herein by reference.

BACKGROUND

The present disclosure relates to a system that is operable to pick individual pieces of particulate matter from a bin, weigh those individual pieces, and then sort the weighed individual pieces for further processing.

There exist a number of industrial applications where it becomes important for weight information to be collected with respect to individual pieces of particulate matter. In this context, "particulate matter" refers to objects having a uniform or non-uniform size and shape that generally possess a granular, pelletal or pill-like character having an average volume of between 5 and 500 cubic millimeters and/or an average weight of between 0.001 and 10 grams.

As a specific example, in the agricultural industry, and more specifically in the seed breeding industry, it is important for scientists to accurately know the weight of individual seeds (i.e., the species of "particulate matter" of interest). This information, in conjunction with other pieces of analytic data (such as trait data, molecular data, magnetic resonance data, color data, size data, shape data, and the like), assists the scientist/breeder in selectively choosing certain seeds (and families of seeds) for further breeding and/or analysis.

As another example, in the pharmaceutical industry, it may be important to deliver known quantities with certain weight characteristics to a certain process. In this way, the scientist/formulator can precisely control the amount of a certain component that is contributed in producing a given product. The same holds true in the chemical industry where the constituent parts of a chemical composition must be known and accurately delivered by weight.

The generally small size of individual pieces of particulate matter makes them quite difficult and inconvenient for human manipulation. For example, it is quite difficult for many humans to accurately select, grasp and handle a single piece of particulate matter (like a seed or pill or grain or particle) from a bin containing hundreds or thousands of other pieces for placement on, and removal from, a weighing scale. Picking, selecting and working with these individual pieces becomes a very tedious task that provides little job satisfaction. Although humans can and are often employed to perform the job, the foregoing and other factors (including, for example, exorbitant labor costs, concerns with employee turnover, and human errors) are driving a move towards increased, if not complete, automation of the handling process.

There is accordingly a need in the art for an automated solution to the problem of handling particulate matter in a number of contexts including, individually and collectively, operations for: selecting individual pieces from a storage bin; weighing individual pieces; and sorting individual pieces.

SUMMARY

To address the needs discussed above, as well as other needs recognized by those skilled in the art, an automated machine is used to handle and manipulate individual pieces of particulate matter. The machine operates to pick single individual pieces of the particulate matter from a bin containing many pieces. The picked individual pieces are then conveyed for further handling. One aspect of this handling involves individually weighing each piece of the picked particulate matter. Another aspect of this handling involves sorting the individual pieces of particulate matter into a plurality of receptacles. Yet another aspect of this handling involves both weighing and then sorting the individual pieces of particulate matter. The sorting operation may, but need not necessarily, be performed based upon the measured weight of each piece.

More specifically, in accordance with one aspect of the disclosure, a machine is provided that includes a piston having an end with a concave depression therein. The piston is positioned to pass through an opening in a bottom portion of a bin. An actuator is coupled to the piston and is operable to move the piston through the opening in the bin between a first position substantially flush with the opening in the bottom portion of the bin and a second position where the end is raised above the bottom portion of the bin. When the bin contains particulate matter, the movement of piston from the first position to the second position under the control of the actuator causes a single individual piece of particulate matter in the bin to be captured by the concave depression and raised above the bottom portion.

In accordance with another aspect of the present disclosure, an individual piece of particulate matter, once captured, is next removed and conveyed. In a preferred embodiment, the removed individual piece is conveyed through a tube using a pressurized air stream. In one embodiment, the conveyed piece is carried to a location (such as a scale) where a weighing operation is performed. In another embodiment, the conveyed piece is carried to a location where a sorting operation is performed. In yet another embodiment, the conveyed piece is carried first to be weighed and then is further conveyed to be sorted.

Another aspect of the present disclosure utilizes an air jet to blow a weighed individual piece of particulate matter off the scale to be conveyed. In a preferred embodiment, the removed individual piece is conveyed through a tube using a pressurized air stream generated by the air jet. In an embodiment, the conveyed piece is carried to a location where a sorting operation is performed. In accordance with another embodiment, two air jets, offset in angle from each other, are selectively actuated to blow the weighed individual piece of particulate matter off the scale. Preferably, the two air jets are mutually exclusively actuated to send the individual piece for conveying to a selected one of two distinct locations.

BRIEF DESCRIPTION OF THE DRAWINGS

A more complete understanding of the method and apparatus of the present disclosure may be acquired by reference to the following Detailed Description when taken in conjunction with the accompanying Drawings.

FIG. 1 is a functional block diagram a particulate matter handling system in accordance with the present disclosure.

FIGS. 2A and 2B are schematic side views of one embodiment for a picking portion of the selection subsystem utilized within the system of FIG. 1.

DETAILED DESCRIPTION

Figure 3A:
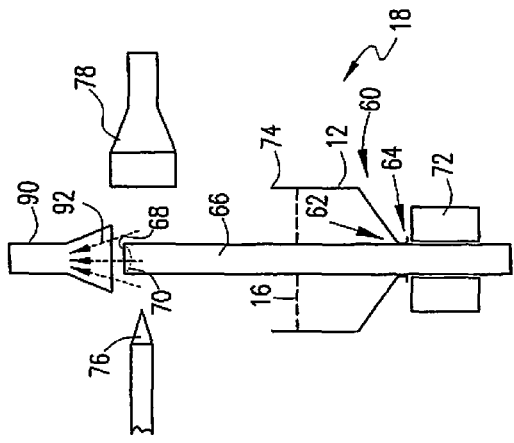
FIGS. 3A through 3C are schematic side views of another embodiment for the picking portion of the selection subsystem utilized within the system of FIG. 1.

Reference is now made to FIG. 1 wherein there is shown a functional block diagram of a particulate matter handling system 10 in accordance with the present disclosure. A bin 12 is sized to hold a large number of individual pieces 14 of particulate matter 16 (for example, tens to thousands, or more). A selection subsystem 18 operates to pick 20 individual pieces 14 of particulate matter 16 from the bin 12, and then route 22 the picked individual pieces for further handling. As a specific example of the further handling that could be performed by the system 10, the picked 20 individual pieces 14 of particulate matter 16 may be routed 22 to a weighing subsystem 28 where they are individually deposited on a scale 24 and weighed 26. As another example of the further handling that could be performed by the system 10, the picked 20 individual pieces 14 of particulate matter 16 may be routed 22 to a sorting subsystem 30 where they are individually sorted 32 and deposited 36 in selected locations 34.

Node 38 in the routing 22 path for the operation of the selection subsystem 18 represents an alternative path selection point (implemented, for example, using a diverter mechanism) where the system 10 may choose to send the picked 20 individual pieces 14 of particulate matter 16 either directly to the weighing subsystem 28 or directly to the sorting subsystem 30. The system 10 is thus operable in one of two modes: a first mode for picking and weighing; and, a second mode for picking and sorting; with that mode choice implemented through the selection subsystem 18 and its control over the alternative path selection point node 38. In this configuration, a user of the system 10 may selectively choose how the picked 20 individual pieces 14 of particulate matter 16 are handled to achieve desired processing and handling goals. It will further be understood by one skilled in the art that a system 10 may be implemented including only the components necessary to implement one of the two identified modes (for example, just a pick and sort (mode 2) system without any provision being made for a weighing application or option, if desired).

It is recognized, for many scientific applications, that both weighing and sorting operations are necessary with respect to picked 20 individual pieces 14 of particulate matter 16. In this regard, the sorting operation may be performed based in whole or in part on the measured weight. Alternatively, the sort is not necessarily weight driven, but knowledge, once sorted, of individual piece 14 weight is important for the scientific investigation being performed.

To assist in a scientific investigation where use of both the weighing subsystem 28 and the sorting subsystem 30 are necessary, the system 10 further includes an inter-subsystem passing device 40 that operates to collect 42 individual pieces 14 of particulate matter 16 from the scale 24 of the weighing subsystem 28 (after weighing 26), and then pass 44 the collected individual pieces to the sorting subsystem 30 where they are individually sorted 32 and deposited 36 in selected locations 34. It is also possible for the inter-subsystem passing device 40 to collect 42 individual pieces 14 from the scale 24 of the weighing subsystem 28 (after weighing 26), and then pass 44 the collected individual pieces on for other handling (perhaps as being rejected for delivery to the sorting subsystem 30). The system 10 is thus further operable in a third mode for picking, weighing, and then sorting; with that mode choice implemented through the selection subsystem 18 and its control over the alternative path point node 38 and the operation of the inter-subsystem passing device 40. Sorting in this context includes not only the actions taken to sort 32 to selected locations 34 in the sorting subsystem 30, but also to the actions taken in the inter-subsystem passing device 40 to reject/forward individual pieces on for handling.

The operation of the system 10 is preferably completely automated. More specifically, the operations performed by the selection subsystem 18, weighing subsystem 28, sorting subsystem 30 and inter-subsystem passing device 40 preferably occur substantially without need for human interaction, intervention or control. It is also possible for any needed actions to load the particulate matter 16 into the bin 12 and/or physically manipulate and change the structure of the locations 34 (either individually or collectively, such as receptacles, trays, or the like) where sorted individual pieces 14 are deposited, to be automated as well. These actions, however, are generally done manually with human participation without detracting from the improved performance obtained by the system 10 in comparison to other semi-automated and/or manual systems in the prior art.

To effectuate this automated operation over all or substantially all of the system 10, a central controller 46 is included that may comprise a specially programmed computer and associate peripheral devices that enable communication with, and control over the operations of, the various components of the system 10. As an example, the central controller 46 may comprise a Pentium III® class personal computer running a Windows NT® operating system with a custom C++ application executing to control component operations. Use of the Pentium/Windows combination opens the door for the use of other custom or commercial (off-the-shelf) applications in conjunction with the control operation application to exchange data (for example, use of spread sheet or report generating applications to output particulate matter handling data to the user).

A peripheral controller 48, connected to the central controller 46, interfaces with the system 10 components, and directs, under the instruction of the central controller pursuant to the executing custom application, system component operation. For example, the peripheral controller 46 may function to control the operation of the each of the selection subsystem 18, weighing subsystem 28, sorting subsystem 30 and inter-subsystem passing device 40, both individually and in a coordinated effort with each other. The peripheral controller 48 may comprise a Parker 6K Compumotor controller manufactured by the Parker Hannifin Corp. A more detailed explanation of peripheral controller 48 operation is provided herein in connection with FIG. 9. The connection 50 between the peripheral controller 48 and the central controller 46 may comprise any network-based type connection and more specifically may utilize an ethernet 10-base T connection.

In addition to storing programming for controlling system 10 operation, the memory (or other data storage functionality, not explicitly shown but inherently present) provided within the central controller 46 is used to store the weights 26 of the individual pieces 14 of particulate matter 16 in tabular, database, or other suitable format. This weight information (more generally referred to as data 52) is collected from the system 10 operation and delivered to the central controller 46 for storage and/or manipulation, as necessary. Still further, the memory of the central controller 46 may also obtain data 52 that is received from, or is derived in connection with controlling the operation of, the sorting subsystem 30 concerning the locations 34 where picked 20 individual pieces 14 of particulate matter 16 have been deposited 36. Preferably, this location data is correlated in the tabular, database, or other format, with the stored weight data on an individual piece-by-piece basis.

The system further includes a number of sensors 54 that operate to detect conditions of interest in the system and report that information to either or both the central controller 46 and/or the peripheral controller 48. With this information, the central controller 46 and the peripheral controller 48 exercise control (generally illustrated by arrow 56) over the operations and actions taken by the various components of the system 10. For example, the sensed condition information may concern: the successful picking 20 of an individual piece 14 from the bin 12; position of the diverting path for the node 38; location of the individual pieces 14 of particulate matter 16 within the system, especially concerning conveyance along, through and past the various system components; the successful collection 42 of the individual pieces of particulate matter from the scale 24 of the weighing subsystem 28; the direction of deposit 36 performed by the sorting subsystem 30; the status (for example, position, location, vacuum, pressure, and the like) of various component parts of the subsystems; operation, maintenance, performance, and error feedback from the various components of the system (separate from, or perhaps comprising or in conjunction with, collected data 52); and the like. More specifically, sensor information that is collected and processed for use in controlling system operation may include information like: device or component status; error signals; movement; stall; position; location; temperature; voltage; current; pressure; and the like, which can be monitored with respect to the operation of each of the components (and parts thereof) within the system 10. Some additional detail on sensor operation and use is provided herein in connection with the discussion of FIG. 9.

Reference is now made to FIGS. 2A and 2B wherein there are shown schematic side views of one embodiment for a picking portion of the selection subsystem 18 utilized within the system of FIG. 1. As can be seen, the bin 12 includes a concave-shaped (inwardly sloped) bottom portion 60. This serves to direct individual pieces 14 of particulate matter 16, through the force of gravity, toward the bottom 62 of the bin 12 as pieces are picked therefrom, and thus enhance the likelihood of picking each piece contained within the bin. At the bottom 62 of the concave-shaped portion 60 is an opening 64. Positioned within the opening 64 is a linear air piston 66. When positioned in an un-actuated position (shown in FIG. 2A), end 68 of the piston 66 is located such that it is substantially flush with the bottom 62 at the opening 64. It will be recognized that "substantially flush" in this context includes a position slightly below the bottom 62 where the opening 64 may act to hold an individual piece for subsequent capture by the piston 66 as described below. The end 68 of the piston 66 is further provided with a concave depression 70 (illustrated in dotted lines) whose perimeter is slightly smaller than the outer diameter of the piston 66 itself. The perimeter of the depression 70 is sized, generally speaking, to be commensurate with, and more particularly, slightly larger than, the expected average size of the individual pieces 14 of particulate matter 16 to be contained within the bin 12 and handled by the system 10. This allows for the handling of individual pieces of non-uniform size/shape. An air drive 72 operates under the control of the peripheral controller 48 and central controller 46 (see, FIG. 1) to linearly move the piston 66 between the un-actuated location shown in FIG. 2A and the actuated location shown in FIG. 2B. When moving towards the actuated location (FIG. 2B), the concave depression 70 at the end 68 of the piston 66 captures an individual piece 14 of particulate matter 16 from the mass of matter in the bin and raises it above the bottom portion to a location above a top edge 74 of the bin 12.

Once an individual piece has been raised above the top edge 74, it is necessary to remove the individual piece from the end of the piston for further handling. An air jet 76 (also actuated under the control of the peripheral controller 48 and central controller 46) is used to blow 80 the individual piece off the end 68 of the piston 66 and into a tube 78 that functions as part of a conveyance mechanism of the selection subsystem 18 to route 22 the picked individual piece for further handling. The air jet 76 may take on any suitable form including, for example, a tube selectively supplied with pressurized air (perhaps through a valve mechanism), with the tube terminated by a nozzle aimed in the direction necessary to blow 80 the individual piece as desired.

As an enhancement to the operation of the picking portion, concurrent with the actuation of the air jet 76, a slight vacuum may be drawn 82 through the open end of the tube 78 to suck the dislodged individual piece 14 of particulate matter 16 into the tube for routing 22. This suction may be effectuated using Venturi (or other suitable suction) forces in a manner well known in the art. Although advantageous, the use of such a suction is not necessary for many system 10 applications.

As an alternate embodiment, the picking portion may in some instances utilize solely the tube 78 along with the drawing 82 of a vacuum therein to remove by suction the individual piece 14 of particulate matter 16 from the end of the piston 66. This suction may be effectuated using Venturi (or other suitable suction) forces in a manner well known in the art.

Figure 3B:
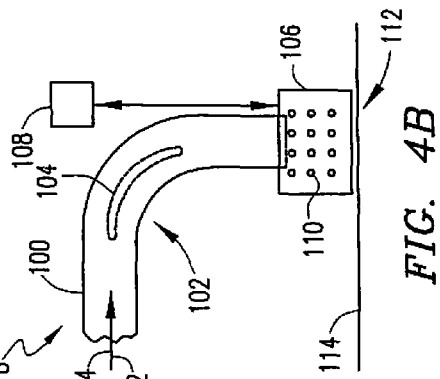
Figure 3C:
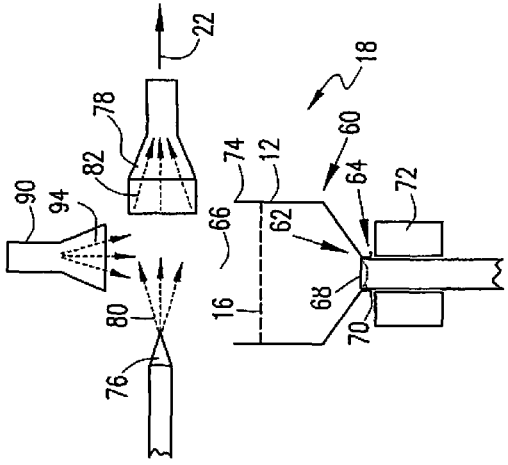

Reference is now made to FIGS. 3A through 3C wherein there are shown schematic side views of another embodiment for the picking portion of the selection subsystem 18 utilized within the system of FIG. 1. The selection subsystem 18 shown in FIGS. 3A-3C has a number of components/operations in common with that shown in FIGS. 2A-2B and described above, thus obviating the need for a repeat description as to those common components/operations.

The air drive 72 operates under the control of the peripheral controller 48 and central controller 46 (see, FIG. 1) to linearly move the piston 66 between the un-actuated location shown in FIG. 3A and the actuated location shown in FIG. 3B, and in that operation raises a captured individual piece 14 of particulate matter 16 above bottom portion of the bin 12 and adjacent a vacuum cup 90. More specifically, in a preferred embodiment, the piston 66 is raised into the actuated location that places the captured individual piece 14 of particulate matter 16 in contact with a vacuum cup 90. To minimize the likelihood of damage caused by such contact, the vacuum cup 90 is preferably spring loaded and thus will give in response to contact caused by the raising of the captured individual piece. At that point, a slight vacuum is drawn (dotted arrows 92; under the control of the peripheral controller 48 and central controller 46) to hold the seed within the vacuum cup 90. This vacuum may be drawn using Venturi forces in a manner well known in the art. The piston 66 is then returned to the un-actuated location shown in FIG. 3C (and thus be positioned to start the process for picking a next individual piece).

The individual piece held by the vacuum cup 90 is now ready to be delivered for further processing. In a substantially simultaneous manner (under the control of the peripheral controller 48 and central controller 46), the vacuum cup 90 releases the held individual piece (perhaps using a positive pressure 94 in addition to gravitational force) and an air jet 76 is used to blow 80 the released individual piece into a tube 78 that functions as part of a conveyance mechanism to route 22 the picked individual piece for further handling.

Figure 4A:
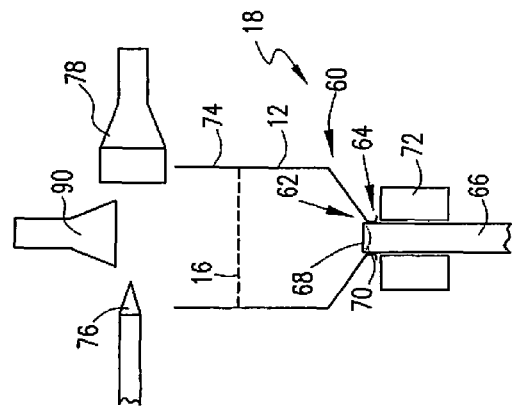
FIGS. 4A and 4B are schematic side views of a depositing portion of the selection subsystem utilized within the system of FIG. 1.
Figure 4B:
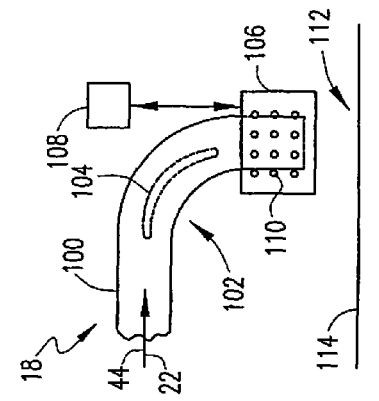

Reference is now made to FIGS. 4A and 4B wherein there are shown schematic side views of a depositing portion of the selection subsystem 18 utilized within the system of FIG. 1. A tube 100 carries the picked and routed 22 (or passed 44) individual piece in a pressurized air stream (introduced by the air jet 76 in FIGS. 2B and 3C). An elbow section 102 of the tube translates horizontal travel from the tube 78 (see, generally, FIGS. 2A and 3A) into vertical travel (if necessary) for the purpose of depositing the individual piece at a certain location. To minimize the risk of damage to the individual piece, however, a systematic deceleration of the traveling piece is performed by the depositing portion in a velocity transition region of the tube 100. In the illustrated embodiment, the velocity transition region generally coincides with the location of the elbow section 102 and the termination of the tube, although this need not necessarily be the case. The elbow section 102 of the tube 100 includes a plurality of longitudinal cuts 104 (shown in dotted line format) made in the interior surface of the tube. The cuts 104 expand the volume within the tube 100 in the area of the elbow section 102 and this results in a reduction in the air pressure at that location. The reduction in air pressure effectuates a slowing in the travel velocity of the individual piece being carried within the pressurized air stream.

At the distal end of the tube 100 is a collar 106. In a preferred embodiment, the collar 106 is pneumatically actuated 108 to slide between an un-actuated location shown in FIG. 4A and an actuated location shown in FIG. 4B. The collar 106 includes a plurality of radial holes 110 drilled therein at various heights about its perimeter. Two functions are served by the collar 106. First, when lowered into the actuated location (FIG. 4B), the collar 106 defines a fence that acts to contain the deposited individual piece within a certain area 112 of the deposited location 114. Second, the pattern of the holes 110 in the collar 106 allows the pressurized air stream to escape in a controlled manner, reduces the air pressure in the tube 100 at the collar, and further slows the travel velocity of the individual piece within the pressurized air stream as it reaches the deposited location 114.

Figure 7:
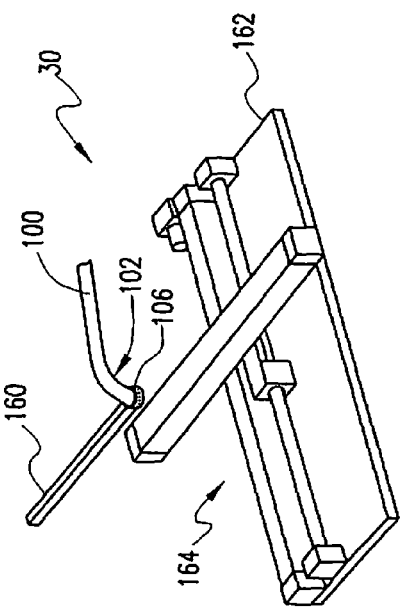
FIG. 7 is a schematic orthogonal diagram of a sorting subsystem utilized within the system of FIG. 1.
Figure 8:
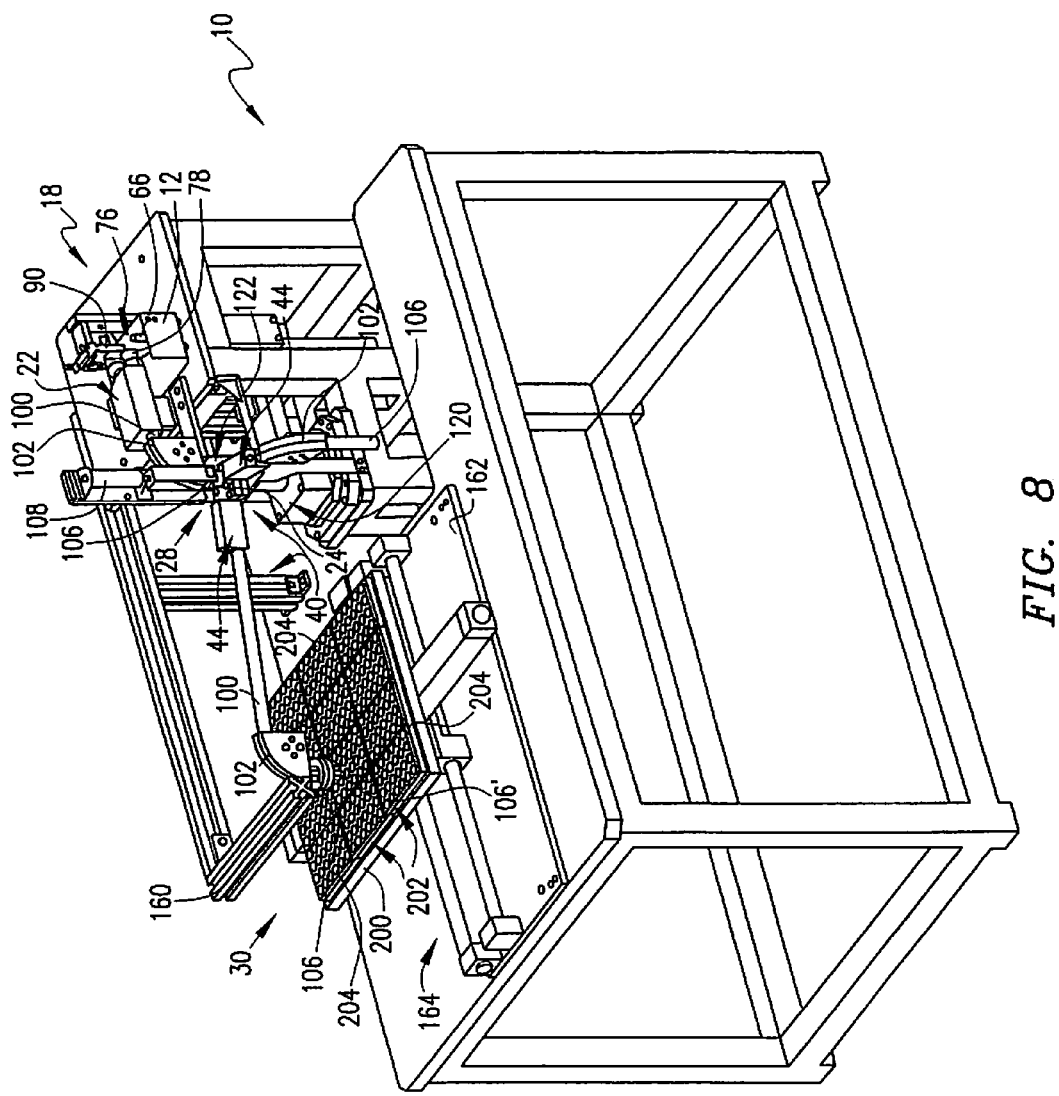
FIG. 8 is an orthogonal view of a particulate matter handling system in accordance with the present disclosure.

It will be recognized that in some applications, the collar 106 may be fixed to the distal end of the tube 100, in which case there is no need for a pneumatic actuator 108 (see, for example, the sorting subsystem 30 as illustrated in FIGS. 7 and 8). It will further be recognized that no collar 106 is necessarily required, and that the holes 110 may alternatively be formed radially in the tube 100 itself at a location near its distal end to assist with velocity transition.

The depositing portion of the selection subsystem 18 shown in FIGS. 4A and 4B may be used to deliver pieces to either the weighing subsystem 28 (for deposit on the scale) or the sorting subsystem 30 (for deposit at a sorter selected location). The use of a slidable collar 106 in either case allows for accurate and controlled delivery of the individual piece to be made by the selection subsystem 18 (when the collar is down). Additionally, when the collar 106 is up, the selection subsystem 18 does not interfere with the operation of the scale 24 (FIG. 1) or router 32 (also, FIG. 1) mechanisms.

Figure 5:
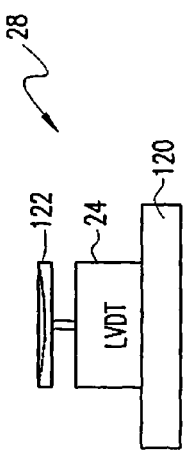
FIG. 5 is a schematic diagram of the weighing subsystem utilized within the system of FIG. 1.

Reference is now once again made to FIG. 1, and also to FIG. 5 wherein there is shown a schematic diagram of the weighing subsystem 28. The scale 24 used within the weighing subsystem 28 may be any suitable scale providing accurate weight measurements within a required degree (for example, measured out to hundredths or thousandths of the desired measurement unit). For example, in a preferred embodiment, the scale is based on a linear variable differential transformer (LVDT) with an ultra fine resolution displacement. The LVDT scale 24 is preferably mounted on a vibration-isolated mount 120. A concave weighing pan 122 is used to hold the sample (i.e., an individual piece of particulate matter) while the weighing operation is performed, and is connected to the LVDT load cell. This weighing pan 122 may itself be mounted to a heavy, large block (not explicitly shown) to further minimize the adverse effects of vibration on measurement accuracy.

The LVDT can be subjected to a maximum dynamic impact force (for example, of about 200 milligrams). The cuts 104 and holes 110 (see, FIG. 4A) in the velocity transition region, as discussed above, assist in slowing down the velocity of the individual piece such that impact when delivered to the weighing subsystem is at or below the impact limits of the scale 24.

Once an individual piece is present on the pan 122, weight data 52 is collected and the central controller 46 examines the derivative of the weight signal output from the LVDT. This allows the system 10 to determine when the scale has settled following placement of the individual piece thereon. The weight signal output is preferably filtered and conditioned in a manner well known to those skilled in the art using an electric read-out system (not explicitly shown). A weight algorithm executed by the central controller 46 takes multiple weight readings until the readings fall within certain predefined error criteria (for example, a hysteresis or offset), and then the last measured weight (or an average of a certain number of recent measurements) is stored in memory (perhaps in combination with other data, as discussed elsewhere herein, to allow for tracking of the individual pieces).

Figure 6:
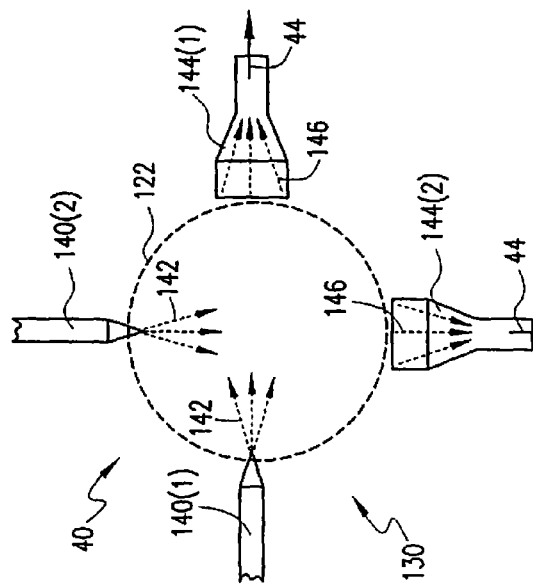
FIG. 6 is a schematic top view of a ducted port system for the inter-subsystem passing device utilized within the system of FIG. 1.

Reference is now made to FIG. 6 wherein there is shown a schematic top view of a ducted port system 130 portion of the inter-subsystem passing device 40. The ducted port system 130 is mounted about the concave weighing pan 122 (shown in dotted lines) and is utilized to selectively collect 42 individual pieces 14 of particulate matter 16 from the scale 24 of the weighing subsystem 28 (see, also, FIG. 1). At least one air jet 140 (actuated under the control of the peripheral controller 48 and central controller 46) is used to blow 142 the individual piece off the pan 122 and into a tube 144 that functions as part of a conveyance mechanism to pass 44 the collected individual pieces for further handling. One option for such further handling of the individual pieces is to accept the pieces and send them on to the sorting subsystem 30 where they are individually routed 32 and deposited 36 in selected locations 34 (see, FIG. 1). Another option for such further handling is to reject the individual pieces and send them on for disposal or other appropriate handling (also shown in FIG. 1).

To effectuate such multiple options for handling, a plurality of air jets 140 may be used. As an example, and as shown in FIG. 6, two air jets 140(1) and 140(2), offset from each other by ninety degrees (for example), are aimed at the pan 122 and selectively actuated to displace the weighed individual piece for a selected one of two or more possible options. For example, actuating air jet 140(1) alone would cause the collection 42 of an individual piece in the opposite tube 144(1), while actuating air jet 140(2) alone would cause the collection 42 of an individual piece in the opposite tube 144(2).

As an enhancement to the operation of the ducted port system, concurrent with the actuation of the air jet 140, a slight vacuum may be drawn 146 through the open end of the tube 144 to suck the dislodged individual piece 14 of particulate matter 16 into the tube for passing 44. This suction may be effectuated using Venturi (or other suitable suction) forces in a manner well known in the art. Although advantageous, the use of such a suction is not necessary for many system 10 applications.

Reference is now made to FIG. 7 wherein there is shown a schematic orthogonal diagram of a sorting subsystem 30 utilized within the system of FIG. 1. A support arm 160 suspends the tube 100 (at about the elbow portion 102) for the inter-system passing device 40 (or the selection subsystem 18) over a support table 162. Mounted to the support table 162, under the location of the elbow portion 102, is an X-Y translation stage 164. One or more trays (not shown, see, FIG. 8), each defining one or more locations 34 (see, FIG. 1) where individual pieces 14 of particulate matter 16 may be deposited 36, can be supported by the x-y translation stage 164. Under the command of the central controller 46 and the peripheral controller 48, the x-y translation stage 164 moves the supported tray(s) such that selected ones, and perhaps all, of the locations 34 are sequentially positioned under the end of the tube 100. With each such positioning, an individual piece conveyed through the tube 100 pursuant to the routing 22 or passing 44 actions, is effectively sorted by the sorting subsystem 30 into the positioned location 34. Data 52 that is received from, or is derived in connection with the operation of, the sorting subsystem 30 concerning the locations 34 where the individual pieces of particulate matter have been deposited 36 is collected by the central controller 46 and stored in memory (perhaps in combination with other data, such as weight data, as discussed elsewhere herein, to allow for tracking of the individual pieces).

Although only one x-y translation stage is shown for moving the locations 34 underneath the collar 106, it will be recognized by those skilled in the art that alternatively the locations 34 could be fixed and the tube 100, elbow portion 102 and collar 106 could be moved using an x-y translation stage into position for depositing sorted individual pieces. Still further, it will be recognized that as a further alternative both the locations 34 and the tube 100, elbow portion 102 and collar 106 each could be moved using a separate x-y translation stage. Coordinated movement of the two translation stages would be required to achieve alignment for deposition of individual pieces into the proper locations 34.

The implementation described above provides for the placement of a single individual piece of particulate matter in each location 34. It will be recognized that sorting to this degree of granularity may not be required in some industrial applications. For example, in the context of an operation to sort into weight classes, a number of locations 34 may be provided, with each location assigned by the system 10 to a certain weight range. As the process described above for picking and weighing individual pieces proceeds, the sorting operation performed by the sorting subsystem 30 collects all picked individual pieces whose measured weight falls within the defined weight range into the corresponding location 34 for that range. Any individual pieces whose weight fails to fall within one of the defined ranges are rejected by the inter-subsystem passing device 40.

Reference is now made to FIG. 8 wherein there is shown an orthogonal view of a particulate matter handling system 10 in accordance with the present disclosure that is engineered to implement the third mode of operation (pick, weigh, sort). The illustrated system 10 is designed for the handling of agricultural products, more specifically, seeds. It will be recognized that the illustration does not show each and every component or part of the system 10. Certain components and parts are not shown in the illustration to reveal other more important components and parts or to simplify the illustration and allow for a better understanding of how the system is assembled and operates. Cross-reference to the system 10 block diagram of FIG. 1 (and its description), as well as to other FIGURES, may be of some assistance in better understanding system operation.

Seeds (i.e., the particulate matter being handled) are loaded into the bin 12. This particular implementation of the system 10 utilizes the selection subsystem 18 embodiment illustrated in FIGS. 3A-3C. Individual seeds are raised by the piston 66, held by the vacuum cup 90 and blown by the air jet 76 into the tube 78. It will be noted that the system 10 shown in FIG. 8 includes two selection subsystems 18, and that this configuration presents some advantages. For example, the use of two pistons 66 increases the likelihood that for each actuation of the pistons, at least one seed will be picked. Additionally, if both pistons 66 successfully pick a seed, throughput can potentially be increased and fewer piston actuations will be needed. Still further, two bins allow for concurrent handling of different types/kinds of seeds.

The picked seed is handled through tube 100 and deposited onto the scale 24 of the weighing subsystem 28. It will be noted that the selection subsystem 18 utilizes the delivery mechanism illustrated in FIGS. 4A and 4B with a pneumatically actuated 108 collar 106 to ensure precise deposit of the seed onto the scale 24 pan 122.

Some specific details of the inter-subsystem passing device 40 are obscured in the illustration (see, for example, FIG. 6 for more detail). However, it will be noted that two exit options are provided, one which leads to the sorting subsystem 30 and another which leads to a rejection (see, FIG. 1).

A tray 200 rests on the x-y translation stage 16. A registration mechanism, such as an alignment guide, edge(s) or pin(s) is provided with the translation stage to ensure accurate and consistent placement of the tray 200 on the stage. The tray 200 is sized to receive a certain number of plates 202 (twelve such plates are shown). Each plate 202 includes a certain number of wells 204, with each well comprising a location 34 (see, FIG. 1) where a single seed may be deposited 36. The x-y translation stage 164 moves the tray 200 holding the plurality of plates 202 such that each well 204 is sequentially positioned underneath the collar 106 of the sorting subsystem 30.

It will be noted that the sorting subsystem 30 utilizes the delivery mechanism illustrated in FIGS. 4A and 4B minus the use of a pneumatically actuated 108 collar 106. A fixed collar 106, as discussed previously is used. It will further be noted that a second collar 106' is attached to the delivery mechanism. Preferably, this attachment is made using a magnetic device. An advantage of this is that the collar 106' is then easily broken away from the delivery mechanism in the event of a hang-up or interference between the sorting subsystem and the plates 202 or wells 204 as the x-y translation stage 164 attempts to move the tray 200.

Figure 9:
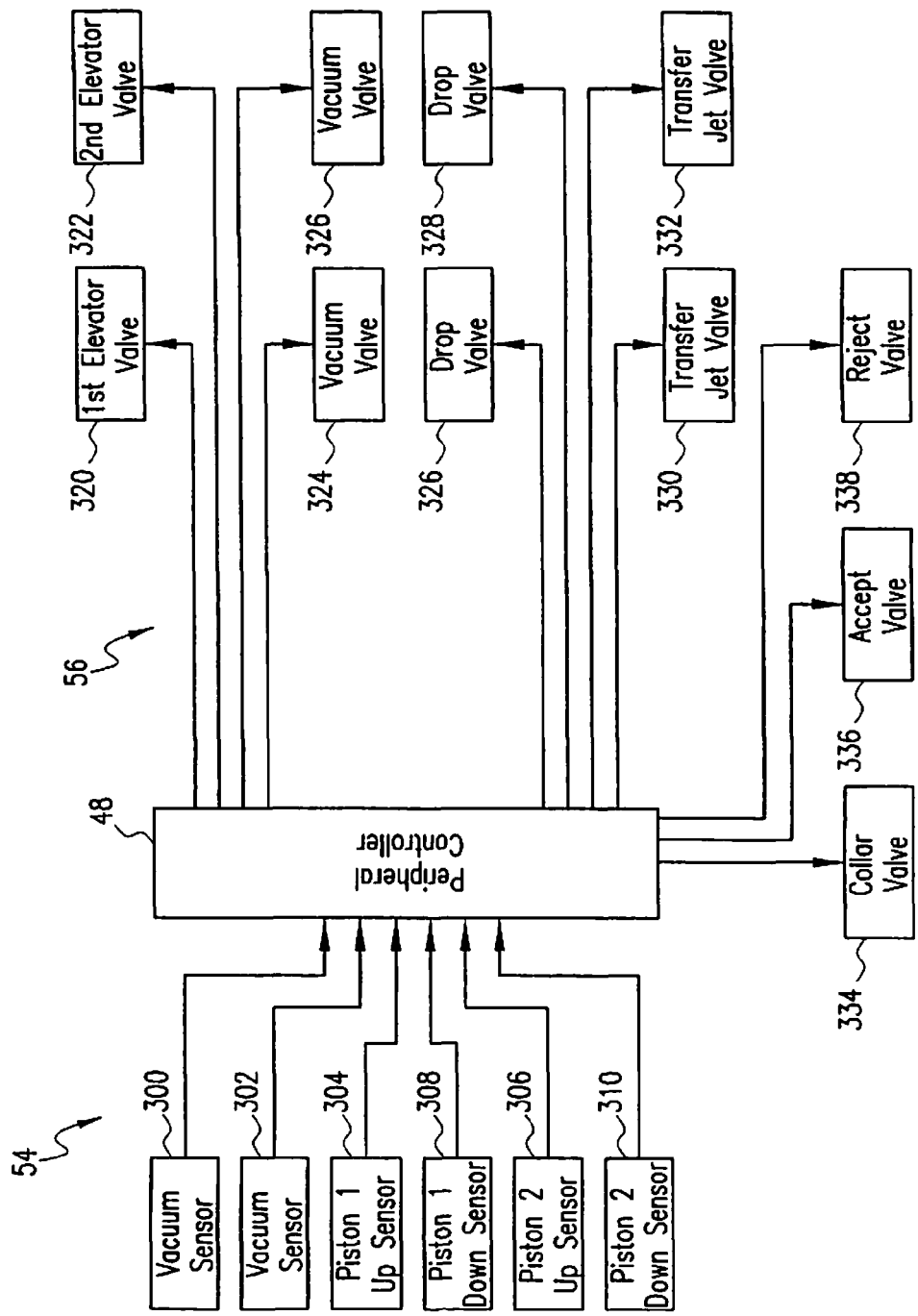
FIG. 9 is a schematic diagram of the control operation for the particulate matter handling system of the present disclosure.

Reference is now made to FIG. 9 wherein there is shown a schematic diagram of the control operation for the particulate matter handling system 10 of the present disclosure. A peripheral controller 48 is directly in charge of managing system operation. The peripheral controller 48 operates under the control and direction of the central controller 46 (see, FIG. 1). Taking the configuration of the system 10 shown in FIG. 8 as an example, the peripheral controller 48 receives a number of sensor 54 inputs. Two vacuum sensors 300 and 302 are used in connection with the FIGS. 3A-3C pair of selection subsystems 18 to sense, based on vacuum pressure, when an individual piece of particulate matter has been successfully held by the vacuum cup 90. One such sensor is needed for each vacuum cup 90 within the implementation shown in FIG. 8, as discussed above, which makes use of two pistons 66. Four piston position sensors (two for up: sensors 304 and 306; and two for down: sensors 308 and 310) are used in connection with the FIGS. 3A-3C selection subsystem 18 operation to sense the position of each of the two pistons 66 and assist in making piston actuation start and stop decisions.

The peripheral controller 48 further exercises control (generally illustrated by arrow 56 in FIG. 1) over the operations and actions taken by the various components of the system 10. Taking the configuration of the system 10 shown in FIG. 8 as an example, the peripheral controller 48 controls a first and second elevator solenoid valve 320 and 322, respectively, to pneumatically actuate the pistons 66 to move between the up and down positions (as sensed by the sensors 304-310). A pair of vacuum solenoid valves 324 and 326 are controlled by the peripheral controller 48 to draw the vacuum at the vacuum cups 90 that hold the picked seeds within the selection subsystem 18. More specifically, each of these valves 324 and 326 allow pressurized air to be input to a Venturi block that is used for the purpose of drawing a suction at the vacuum cups 90. In connection with the operation of the vacuum cups 90, the peripheral controller 48 may further control a pair of drop solenoid valves 326 and 328 which allow pressurized air to be applied to the vacuum cups to blow a held seed away. This may be useful to assist gravitational forces in dropping the held seeds from the vacuum cups 90. Preferably, the valves 326 and 328 are actuated when the valves 324 and 326 are un-actuated (and vice-versa). The peripheral controller 48 still further controls a pair of transfer jet solenoid valves 330 and 332 which allow pressurized air to be applied to the air jets 76 within the selection subsystem 18 that blow the picked seeds into the tubes 78. In order ensure only a single seed is processed at a time, operation of the valves 330 and 332 is generally mutually exclusive and coordinated, also in a mutually exclusive manner, with the operation of the valves 326 and 328. A collar solenoid valve 334 is controlled by the peripheral controller 48 to pneumatically actuate (reference 108) the collar 106 to move between the up and down positions and thus control the placement of the picked seed on the pan 122 of the scale 24. Down movement of the collar 106 must be closely controlled so that the collar does not impact on or damage the pan 122 (and thus possibly damage the sensitive LVDT load cell). Finally, the peripheral controller 48 controls an accept solenoid valve 336 and a reject solenoid valve 338 which allow pressurized air to be applied to the air jets 140 within the inter-subsystem passing device 40 that selectively blow the weighed seeds off the weighing pan 122 for either sorting in the sorting subsystem 30 or rejection. In order to ensure proper forwarding of the weighed seed in the right direction, operation of the valves 336 and 338 is generally mutually exclusive.

Although preferred embodiments of the method and apparatus of the present disclosure have been illustrated in the accompanying Drawings and described in the foregoing Detailed Description, it will be understood that the disclosure is not limited to the embodiments disclosed, but is capable of numerous rearrangements, modifications and substitutions without departing from the spirit of the disclosure as set forth and defined by the following claims.

What is claimed is:

1. A machine, comprising:
a selection apparatus configured to select individual pieces of particulate matter from a plurality of pieces of particulate matter;
a weighing apparatus configured to receive the selected individual pieces of particulate matter and individually weigh the received pieces of particulate matter;
a sorting apparatus configured to sort the individually weighed pieces of particulate matter;
a first transport mechanism configured to convey the selected individual pieces of particulate matter from the selection apparatus to the weighing apparatus;
a second transport mechanism configured to convey the individually weighed pieces of particulate matter from the weighing apparatus to the sorting apparatus; and
a third transport mechanism configured to selectively convey the individually weighed pieces of particulate matter from the weighing apparatus to a rejection area instead of to the sorting apparatus.

2. The machine of claim 1, wherein the first transport mechanism includes a tube configured to convey the selected individual pieces of particulate matter from the selection apparatus to the weighing apparatus, and wherein the second transport mechanism includes a tube configured to convey the individually weighed pieces of particulate matter from the weighing apparatus to the sorting apparatus.

3. The machine of claim 2, wherein the tube of the first transport mechanism includes a velocity transition region configured to control velocity of the pieces of particulate matter being conveyed by the tube, and wherein the tube of the second transport mechanism includes a velocity transition region configured to control velocity of the pieces of particulate matter being conveyed by the tube.

4. The machine of claim 2, wherein the tube of the first transport mechanism includes a suction tube configured to suck the pieces of particulate matter through the tube, the suction tube having at least one pressure reducing feature formed in the tube configured to control velocity of the individual piece of particulate matter moving through the tube; and wherein the tube of the second transport mechanism includes a suction tube configured to suck the pieces of particulate matter through the tube, the suction tube having at least one pressure reducing feature formed in the tube configured to control velocity of the individual piece of particulate matter moving through the tube.

5. The machine of claim 2, wherein the first transport mechanism further includes an air jet configured to blow the selected individual pieces of particulate matter from the picking apparatus into the tube of the first transport mechanism, and wherein the second transport mechanism further includes an air jet configured to blow the individually weighed pieces of particulate matter from the weighing apparatus into the tube of the second transport mechanism.

6. The machine of claim 1, wherein:
the first transport mechanism includes an air jet and a tube, the air jet configured to blow the selected individual pieces of particulate matter from the selection apparatus into the tube, and the tube configured to convey the selected individual pieces of particulate matter from the selection apparatus to the weighing apparatus;

the second transport mechanism includes an air jet and a tube, the air jet configured to selectively blow the individually weighed pieces of particulate matter from the weighing apparatus into the tube, and the tube configured to convey the individually weighed pieces of particulate matter from the weighing apparatus to the sorting apparatus when blown from the weighing apparatus; and the third transport mechanism includes an air jet and a tube, the air jet being angularly offset from the air jet of the second transport mechanism, the air jet configured to selectively blow the individually weighed pieces of particulate matter from the weighing apparatus into the tube, and the tube configured to convey the individually weighed pieces of particulate matter from the weighing apparatus to the rejection area when blown from the weighing apparatus.

7. The machine of claim 1, wherein the plurality of pieces of particulate matter are in a bin, and wherein the selection apparatus includes a piston moveable in the bin to isolate a single individual piece of particulate matter from the plurality of pieces of particulate matter.

8. The machine of claim 1, wherein the sorting apparatus includes an x-y translation stage operable to selectively move individual ones of a plurality of receptacles into a position to receive the sorted pieces of particulate matter.

9. The machine of claim 1, wherein the particulate matter comprises agricultural seeds.

10. A machine, comprising:
a selection apparatus configured to select individual pieces of particulate matter from a plurality of pieces of particulate matter;
a weighing apparatus configured to receive the selected individual pieces of particulate matter and individually weigh the received pieces of particulate matter; and
a sorting apparatus configured to sort the individually weighed pieces of particulate matter;
wherein the plurality of pieces of particulate matter are in a bin, and wherein the selection apparatus includes a piston moveable in the bin to isolate a single individual piece of particulate matter from the plurality of pieces of particulate matter.

11. The machine of claim 10, further comprising:
a first transport mechanism configured to convey the selected individual pieces of particulate matter from the selection apparatus to the weighing apparatus; and
a second transport mechanism configured to convey the individually weighed pieces of particulate matter from the weighing apparatus to the sorting apparatus.

12. The machine of claim 11, wherein the first transport mechanism includes a tube configured to convey the selected individual pieces of particulate matter from the selection apparatus to the weighing apparatus, and wherein the second transport mechanism includes a tube configured to convey the individually weighed pieces of particulate matter from the weighing apparatus to the sorting apparatus.

13. The machine of claim 12, wherein the tube of the first transport mechanism includes a velocity transition region configured to control velocity of the pieces of particulate matter being conveyed by the tube, and wherein the tube of the second transport mechanism includes a velocity transition region configured to control velocity of the pieces of particulate matter being conveyed by the tube.

14. The machine of claim 12, wherein the tube of the first transport mechanism includes a suction tube configured to suck the pieces of particulate matter through the tube, the suction tube having at least one pressure reducing feature formed in the tube configured to control velocity of the individual piece of particulate matter moving through the tube; and wherein the tube of the second transport mechanism includes a suction tube configured to suck the pieces of particulate matter through the tube, the suction tube having at least one pressure reducing feature formed in the tube configured to control velocity of the individual piece of particulate matter moving through the tube.

15. The machine of claim 12, wherein the first transport mechanism further includes an air jet configured to blow the selected individual pieces of particulate matter from the picking apparatus into the tube of the first transport mechanism, and wherein the second transport mechanism further includes an air jet configured to blow the individually weighed pieces of particulate matter from the weighing apparatus into the tube of the second transport mechanism.

16. The machine of claim 11, further comprising a third transport mechanism configured to selectively convey the individually weighed pieces of particulate matter from the weighing apparatus to a rejection area instead of to the sorting apparatus.

17. The machine of claim 16, wherein:
the first transport mechanism includes an air jet and a tube, the air jet configured to blow the selected individual pieces of particulate matter from the selection apparatus into the tube, and the tube configured to convey the selected individual pieces of particulate matter from the selection apparatus to the weighing apparatus;
the second transport mechanism includes an air jet and a tube, the air jet configured to selectively blow the individually weighed pieces of particulate matter from the weighing apparatus into the tube, and the tube configured to convey the individually weighed pieces of particulate matter from the weighing apparatus to the sorting apparatus when blown from the weighing apparatus; and
the third transport mechanism includes an air jet and a tube, the air jet being angularly offset from the air jet of the second transport mechanism, the air jet configured to selectively blow the individually weighed pieces of particulate matter from the weighing apparatus into the tube, and the tube configured to convey the individually weighed pieces of particulate matter from the weighing apparatus to the rejection area when blown from the weighing apparatus.

18. The machine of claim 10, wherein the sorting apparatus includes an x-y translation stage operable to selectively move individual ones of a plurality of receptacles into a position to receive the sorted pieces of particulate matter.

19. The machine of claim 10, wherein the particulate matter comprises agricultural seeds.

20. A machine, comprising:
a selection apparatus configured to select individual pieces of particulate matter from a plurality of pieces of particulate matter;
a weighing apparatus configured to receive the selected individual pieces of particulate matter and individually weigh the received pieces of particulate matter;
a sorting apparatus configured to sort the individually weighed pieces of particulate matter;
wherein the sorting apparatus includes an x-y translation stage operable to selectively move individual ones of a plurality of receptacles into a position to receive the sorted pieces of particulate matter.

21. The machine of claim 20, further comprising:
a first transport mechanism configured to convey the selected individual pieces of particulate matter from the selection apparatus to the weighing apparatus; and
a second transport mechanism configured to convey the individually weighed pieces of particulate matter from the weighing apparatus to the sorting apparatus.

22. The machine of claim 21, wherein the first transport mechanism includes a tube configured to convey the selected individual pieces of particulate matter from the selection apparatus to the weighing apparatus, and wherein the second transport mechanism includes a tube configured to convey the individually weighed pieces of particulate matter from the weighing apparatus to the sorting apparatus.

23. The machine of claim 22, wherein the tube of the first transport mechanism includes a velocity transition region configured to control velocity of the pieces of particulate matter being conveyed by the tube, and wherein the tube of the second transport mechanism includes a velocity transition region configured to control velocity of the pieces of particulate matter being conveyed by the tube.

24. The machine of claim 22, wherein the tube of the first transport mechanism includes a suction tube configured to suck the pieces of particulate matter through the tube, the suction tube having at least one pressure reducing feature formed in the tube configured to control velocity of the individual piece of particulate matter moving through the tube; and wherein the tube of the second transport mechanism includes a suction tube configured to suck the pieces of particulate matter through the tube, the suction tube having at least one pressure reducing feature formed in the tube configured to control velocity of the individual piece of particulate matter moving through the tube.

25. The machine of claim 22, wherein the first transport mechanism further includes an air jet configured to blow the selected individual pieces of particulate matter from the picking apparatus into the tube of the first transport mechanism, and wherein the second transport mechanism further includes an air jet configured to blow the individually weighed pieces of particulate matter from the weighing apparatus into the tube of the second transport mechanism.

26. The machine of claim 21, further comprising a third transport mechanism configured to selectively convey the individually weighed pieces of particulate matter from the weighing apparatus to a rejection area instead of to the sorting apparatus.

27. The machine of claim 26, wherein:
the first transport mechanism includes an air jet and a tube, the air jet configured to blow the selected individual pieces of particulate matter from the selection apparatus into the tube, and the tube configured to convey the selected individual pieces of particulate matter from the selection apparatus to the weighing apparatus;
the second transport mechanism includes an air jet and a tube, the air jet configured to selectively blow the individually weighed pieces of particulate matter from the weighing apparatus into the tube, and the tube configured to convey the individually weighed pieces of particulate matter from the weighing apparatus to the sorting apparatus when blown from the weighing apparatus; and
the third transport mechanism includes an air jet and a tube, the air jet being angularly offset from the air jet of the second transport mechanism, the air jet configured to selectively blow the individually weighed pieces of particulate matter from the weighing apparatus into the tube, and the tube configured to convey the individually weighed pieces of particulate matter from the weighing apparatus to the rejection area when blown from the weighing apparatus.

28. The machine of claim 20, wherein the plurality of pieces of particulate matter are in a bin, and wherein the selection apparatus includes a piston moveable in the bin to isolate a single individual piece of particulate matter from the plurality of pieces of particulate matter.

29. The machine of claim 20, wherein the particulate matter comprises agricultural seeds.

* * * * *